US009912747B2

(12) United States Patent
Xiong et al.

(10) Patent No.: US 9,912,747 B2
(45) Date of Patent: Mar. 6, 2018

(54) BROWSER AND SYSTEM FOR DOWNLOAD AND DOWNLOAD METHOD

(71) Applicant: BEIJING QIHOO TECHNOLOGY COMPANY LIMITED, Beijing (CN)

(72) Inventors: Peng Xiong, Beijing (CN); Huan Ren, Beijing (CN)

(73) Assignee: Beijing Qihoo Technology Company Limited, Beijing (CN)

(*) Notice: Subject to any disclaimer, the term of this patent is extended or adjusted under 35 U.S.C. 154(b) by 338 days.

(21) Appl. No.: 14/646,299

(22) PCT Filed: Aug. 23, 2013

(86) PCT No.: PCT/CN2013/082151
§ 371 (c)(1),
(2) Date: May 20, 2015

(87) PCT Pub. No.: WO2014/079244
PCT Pub. Date: May 30, 2014

(65) Prior Publication Data
US 2015/0304412 A1 Oct. 22, 2015

(30) Foreign Application Priority Data
Nov. 26, 2012 (CN) .......................... 2012 1 0487185

(51) Int. Cl.
G06F 15/16 (2006.01)
H04L 29/08 (2006.01)
G06F 17/22 (2006.01)

(52) U.S. Cl.
CPC ...... H04L 67/1085 (2013.01); G06F 17/2235 (2013.01); H04L 67/02 (2013.01); H04L 67/06 (2013.01)

(58) Field of Classification Search
CPC ..... H04L 67/1085; H04L 67/06; H04L 67/02; H04L 67/104; H04L 29/0817; H04L 29/08495
See application file for complete search history.

(56) References Cited

U.S. PATENT DOCUMENTS 7,447,736 B2 * 11/2008 Devine ............... G06F 11/0709
707/E17.107
8,375,384 B2 * 2/2013 Mahajan .................. G06F 8/43
717/171

(Continued)

FOREIGN PATENT DOCUMENTS

WO WO 02/27537 A1 * 4/2002

OTHER PUBLICATIONS

Jie Liang et al., "Cloud Point-to-point data transmission mehtod and system", Jul. 11, 2011, Patent Translate of CN102571941, 5 pages.*

(Continued)

Primary Examiner — Krisna Lim
(74) Attorney, Agent, or Firm — Polsinelli PC (57) ABSTRACT

The invention discloses a browser and system for download and a download method, and relates to the field of internet technologies. The browser for download comprises: a download starting unit configured to start data download of a browser login user at the browser side; a prompt unit configured to prompt to save downloaded data into a network storage server bound to the browser login user at the browser side; a transmission unit configured to receive a download instruction from the user, and upload the data downloaded at the browser side to the network storage server bound to the browser login user; and a reception unit configured to receive address information of the uploaded downloaded data at the network side fed back by the network storage server. The browser, system and method may effectively avoid the occurrence of a situation of (Continued)

repeated download, and improve the efficiency of a user obtaining and using network data.

20 Claims, 7 Drawing Sheets

(56) References Cited

U.S. PATENT DOCUMENTS

| | | | | |
|---|---|---|---|---|
| 8,381,093 | B2* | 2/2013 | Mohan | G06F 17/24 |
| | | | | 715/234 |
| 8,392,539 | B1* | 3/2013 | Chen | G06F 9/4406 |
| | | | | 709/220 |
| 2002/0198963 | A1* | 12/2002 | Wu | G06F 17/30899 |
| | | | | 709/219 |
| 2008/0092193 | A1* | 4/2008 | Lee | H04N 7/17318 |
| | | | | 725/123 |
| 2010/0017616 | A1* | 1/2010 | Nichols | G06F 21/41 |
| | | | | 713/183 |
| 2013/0254656 | A1* | 9/2013 | Florian | G06F 17/2288 |
| | | | | 715/255 |

OTHER PUBLICATIONS

Zhang, H. et al., English abstract only of Chinese application No. CN102420870A, Network file storage method for thin client, publication date Apr. 18, 2012, one page.

Sihua, Y., English abstract only of Chinese application No. CN102546703A, Method and system for transmitting network hard disk file, publication date Jul. 4, 2012, one page.

Jie, L. et al., English abstract only of Chinese application No. CN102571941A, Cloud point-to-point data transmission method and system, publication date Jul. 11, 2012, one page.

International Search Report regarding PCT/CN2013/082151 dated Dec. 5, 2013, 2 pages.

Jie, L. et al., English abstract only of Chinese application No. CN102685223 A, Cloud-storage-based file processing method and system, publication date Sep. 19, 2012, one page.

Xiong, P. et al., English abstract only of Chinese application No. CN102946436A, Download system, publication date Feb. 27, 2013, one page.

* cited by examiner

BROWSER AND SYSTEM FOR DOWNLOAD AND DOWNLOAD METHOD

FIELD OF THE INVENTION

The invention relates to the field of internet technologies, and in particular, to a browser and system for download and a download method.

BACKGROUND OF THE INVENTION

Download is one of the most commonly used functions of a browser, and in general, data needed to be downloaded is saved in a file on a local hard disk. In particular, after a user clicks a download link, he selects to save locally and specifies a download directory, and then the download begins, and data requested from the network is saved in a file, until the download is finished.

The download function of existing browsers can only download data to one computer, and if the computer is changed, it is needed to reopen the web page providing the download and repeat the download, thereby affecting the efficiency of a user obtaining and using network data.

SUMMARY OF THE INVENTION

In view of the above problems, the invention is proposed to provide a browser and system for download, a download method and program, which can overcome the above problems or at least partly solve or mitigate the above problems.

According to an aspect of the invention, there is provided a browser for download comprising: a download starting unit configured to start data download of a browser login user at the browser side; a prompt unit configured to prompt to save downloaded data into a network storage server bound to the browser login user at the browser side; a transmission unit configured to receive a download instruction from the user, and upload the data downloaded at the browser side to the network storage server bound to the browser login user; and a reception unit configured to receive address information of the uploaded downloaded data at the network side fed back by the network storage server.

Accordingly, the invention further provides a download system comprising a browser and a network storage server. The browser comprises: a download starting unit configured to start data download of a browser login user at the browser side; a prompt unit configured to prompt to save downloaded data into a network storage server bound to the browser login user at the browser side; a transmission unit configured to receive a download instruction from the user, and upload the data downloaded at the browser side to the network storage server bound to the browser login user; and a reception unit configured to receive address information of the uploaded downloaded data at the network side fed back by the network storage server. The network storage server comprises: a storage unit configured to store the uploaded downloaded data; and a feedback unit configured to feed address information of the uploaded downloaded data at the network side back to the reception unit.

Accordingly, the invention further provides a method for downloading data at a browser side comprising the steps of: starting data download of a browser login user at the browser side; prompting to save downloaded data into a network storage server bound to the browser login user at the browser side; receiving a download instruction from the user, and uploading the data downloaded at the browser side to the network storage server bound to the browser login user; and receiving address information of the uploaded downloaded data at the network side fed back by the network storage server.

According to yet another aspect of the invention, there is provided a computer program comprising a computer readable code which causes a browser user terminal to perform the method for downloading data at a browser side according to any of claims 13-22, when said computer readable code is running on the browser user terminal.

According to still another aspect of the invention, there is provided a computer readable medium storing the computer program as claimed in claim 23 therein.

The beneficial effects of the invention lie in that: by uploading data downloaded at a browser side to a network storage server, the browser and system for download and the download method as described in the invention can realize storage of downloaded data at the network storage server side (also called cloud storage in the field), and when the downloaded data is used again, it can be obtained directly from the network storage server, thereby avoiding the occurrence of a situation of repeated download, and improving the efficiency of a user obtaining and using network data. Meanwhile, when the downloaded data is stored in multiple network storage servers, this may further play the role of data backup and increase the security of data storage.

The above description is merely an overview of the technical solutions of the invention. In the following particular embodiments of the invention will be illustrated in order that the technical means of the invention can be more clearly understood and thus may be embodied according to the content of the specification, and that the foregoing and other objects, features and advantages of the invention can be more apparent.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the invention. And throughout the drawings, like reference signs are used to denote like components. Therein.

DETAILED DESCRIPTION OF THE INVENTION

In the following exemplary embodiments of the disclosure will be described in more detail with reference to the accompanying drawings. While the exemplary embodiments of the disclosure are shown in the drawings, it will be appreciated that the disclosure may be implemented in various forms and should not be limited by the embodiments set forth herein. Rather, these embodiments are provided in order for one to be able to more thoroughly understand the disclosure and in order to be able to fully convey the scope of the disclosure to those skilled in the art.

Figure 1:
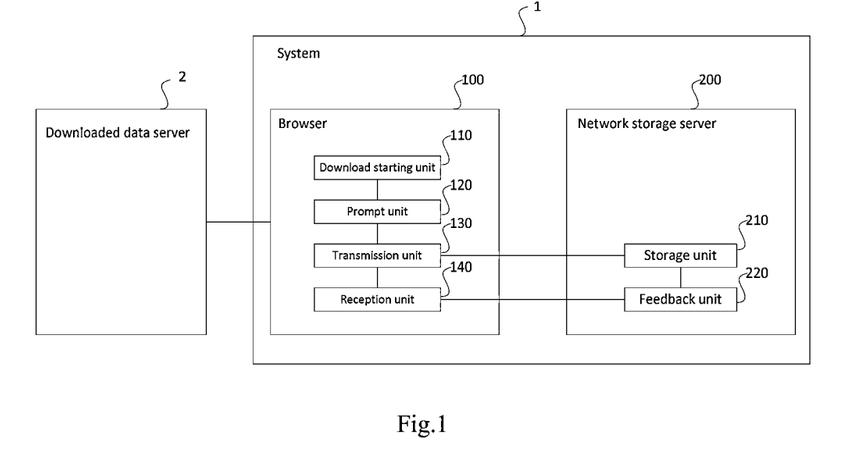
FIG. 1 shows a schematic diagram of a modular structure of a download system according to an embodiment of the invention.

FIG. 1 shows a schematic diagram of a modular structure of a download system according to an embodiment of the invention. As shown in FIG. 1, the download system 1 comprises: a browser 100 and a network storage server 200.

The browser 100 is configured to establish a download link with the downloaded data server 2 to obtain downloaded data. For example, after requesting to download software from a database server (corresponding to the downloaded data server 2 in FIG. 1) of a common software download website and establishing a download link, the browser 100 conducts download of the corresponding software or data according to the name of a downloaded file in the download request. The browser 100, which is a browser for download, comprises the following units:

a download starting unit 110 configured to start data download of a browser login user at the browser side;

a prompt unit 120 configured to prompt to save the downloaded data into a network storage server bound to the browser login user at the browser side;

a transmission unit 130 configured to receive a download instruction from the user, and upload the data downloaded at the browser side to the network storage server bound to the browser login user; and a reception unit 140 configured to receive address information of the uploaded downloaded data at the network side fed back by the network storage server.

The network storage server 200 comprises:

a storage unit 210 configured to store the uploaded downloaded data; and a feedback unit 220 configured to feed address information of the uploaded downloaded data at the network side back to the reception unit.

Figure 2:
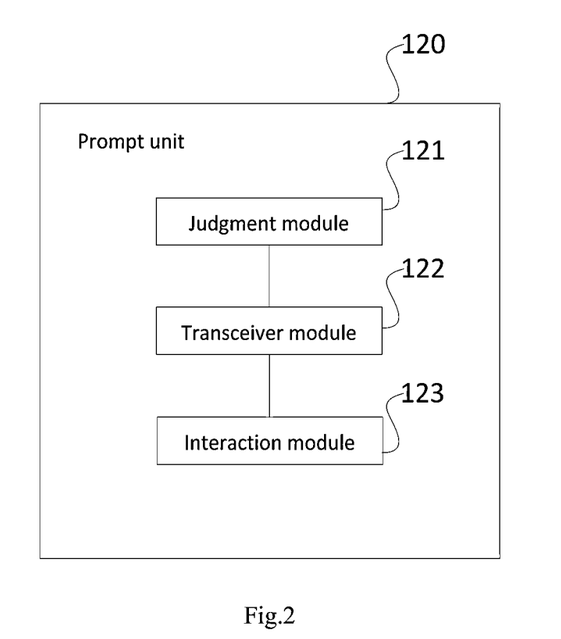
FIG. 2 shows a schematic diagram of a modular structure of a prompt unit according to an embodiment of the invention.

Referring to FIG. 2, the prompt unit 120 further comprises:

a judgment module 121 configured to judge whether the browser login user has logged in the network storage server 200;

a transceiver module 122 configured to receive a message sent by the network storage server 200; and an interaction module 123 configured to prompt the browser login user to log in the network storage server 200 in the case that the browser login user has not logged in the network storage server 200, cause a first download thread to prompt the browser login user in a download interface to save the downloaded data into the network storage server 200 according to the message, and prompt the browser login user to select a corresponding memory address according to a file classification.

Figure 3:
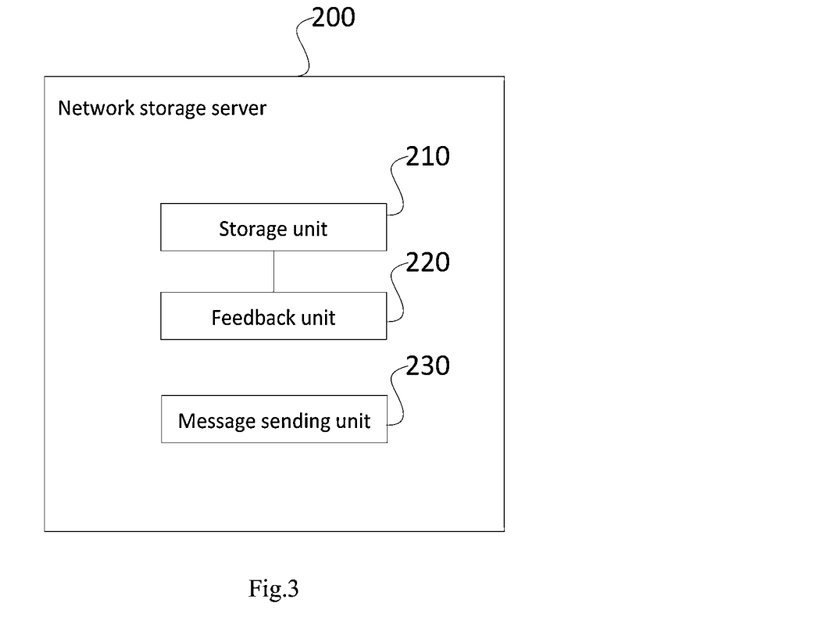
FIG. 3 shows a schematic diagram of a modular structure of a network storage server according to an embodiment of the invention.

Referring to FIG. 3, the network storage server 200 further comprises:

a message sending unit 230 configured to send a message to the browser 100 which has logged in the network storage server 200.

Figure 4:
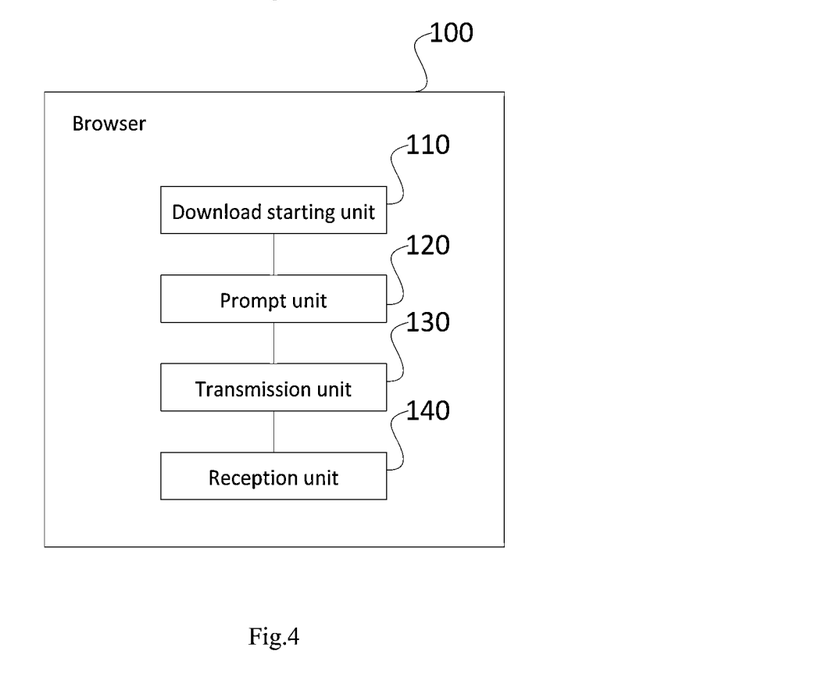
FIG. 4 shows a schematic diagram of a modular structure of a browser according to an embodiment of the invention.

FIG. 4 shows a schematic diagram of a modular structure of a browser according to an embodiment of the invention. As shown in FIG. 4, the browser described in this embodiment is substantially the same as the browser in the system, and in particular, the browser 100 comprises the following units.

A download starting unit 110 is configured to start data download of a browser login user at the browser side.

Figure 5A:
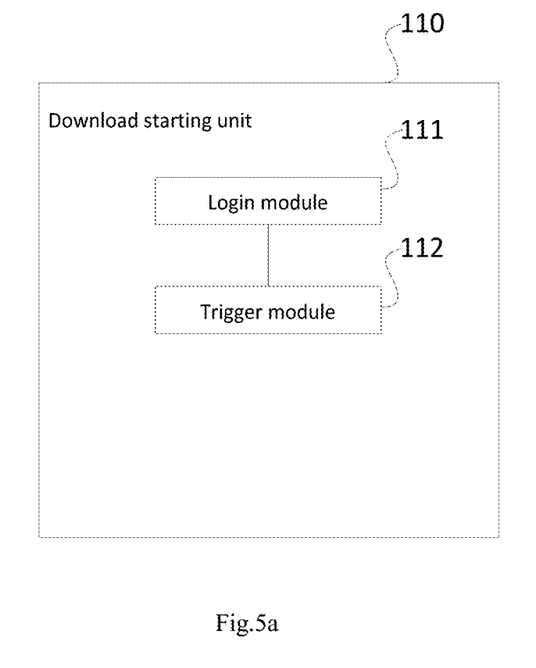
FIG. 5*a* shows a schematic diagram of a modular structure of a download starting unit according to an embodiment of the invention.

Referring to FIG. 5a, the download starting unit 110 further comprises:

a login module 111 configured to log in a browser for user at the browser side; and a trigger module 112 configured to trigger an establishment of a first download thread when a download link is clicked in a browser page.

In addition, the browser login user can be bound to the network storage server 200, namely, the account and password with which the browser login user logs in the browser are identical to the account and password with which he logs in the network storage server; and the login module 111 is further configured to receive the account and password with which the browser login user has logged in the browser and then send them to the network storage server 200 to establish a connection between the computer where the browser 100 is located and the network storage server 200. That is, after the user has logged in the browser 100, the network storage server 200 will be automatically logged in.

A prompt unit 120 is configured to prompt to save the downloaded data into the network storage server 200 bound to the browser login user at the browser side.

Figure 5B:
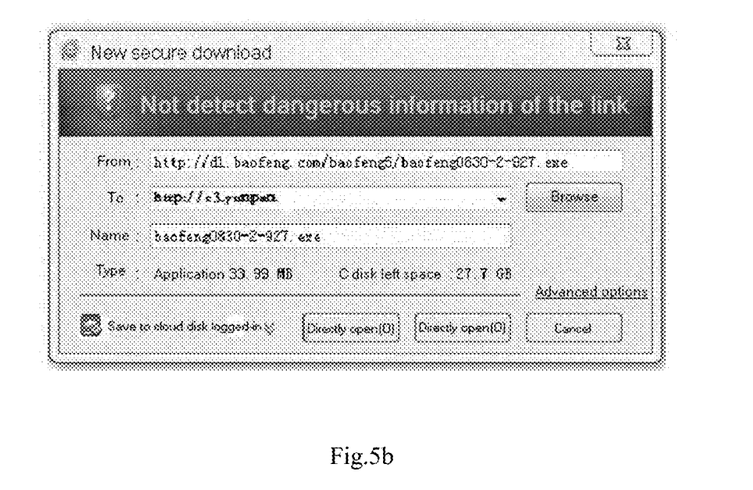
FIG. 5*b* shows a schematic diagram of a download interface according to an embodiment of the invention.

The prompt unit 120 is substantially the same as the prompt unit in the system, and it also comprises:

a judgment module 121 configured to judge whether the browser login user has logged in the network storage server;

a transceiver module 122 configured to receive a message sent by the network storage server; and an interaction module 123 configured to prompt the browser login user to log in the network storage server in the case that the browser login user has not logged in the network storage server, cause the first download thread to prompt the browser login user in a download interface to save the downloaded data into the network storage server according to the message, and prompt the browser login user to select a corresponding memory address according to a file classification (e.g., classified into music, movie, application, etc.). Referring to FIG. 5b, the browser prompts the user in its download interface to "save to a cloud disk logged-in", and the user may click this link and then select a storage path of the network storage server for storing the downloaded data. The cloud disks in embodiments of the invention all refer to a network storage server, here abbreviated as a cloud disk.

The difference is that, in this embodiment, there may be multiple network storage servers bound to the browser login user, and accordingly, the interaction module 123 is further configured to cause the first download thread to prompt the browser login user to select a corresponding network storage server according to the message. That is, all the network storage servers available for the user to select from are displayed in the download interface, the user can select one or more of them, and when the user selects multiple ones, corresponding downloaded data will be stored into the multiple network storage servers, which is equivalent to backup storages of the downloaded data.

A transmission unit 130 is configured to receive a download instruction from the user, and upload the data downloaded at the browser side to the network storage server 200 bound to the browser login user.

Therein, the transmission unit 130 can implement the upload of the downloaded data to the network side storage server according to one of the following three data transmission schemes: 1. first downloading the data to a local computer, and then uploading it to the network side storage server; 2. downloading the data to a local computer, and at the same time uploading it to the network side storage server; 3. directly downloading the downloaded data to the network side storage server.

Figure 6:
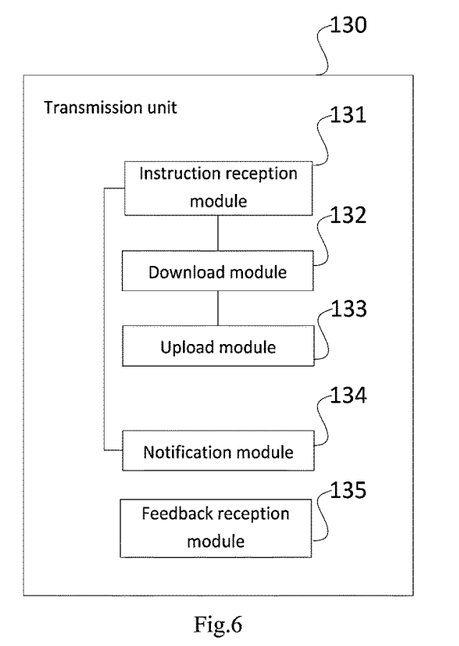
FIG. 6 shows a schematic diagram of a modular structure of a transmission unit according to an embodiment of the invention.

Referring to FIG. 6, the transmission unit 130 further comprises:

an instruction reception module 131 configured to receive a download instruction of a user;

a download module 132 configured to cause the first download thread to download the downloaded data from a resource server to a local computer at the browser side; and an upload module 133 configured to start an upload thread to upload the downloaded data to the network storage server.

The combination of the download module 132 and the upload module 133 can implement the first data transmission scheme described above. To implement the second data transmission scheme described above, the download module 132 is further configured to notify the upload module to start an upload thread in the procedure of the first download thread downloading the downloaded data from a resource server to a local computer at the browser side; and the upload module 133 is further configured to simultaneously upload the downloaded data in the background to the network storage server when the first download thread downloads the downloaded data.

In addition, to implement the third data transmission scheme described above, the transmission unit 130 further comprises: a notification module 134 configured to cause the first download thread to send a notification containing information related to the downloaded data to the network storage server, wherein the network storage server downloads the downloaded data to the network storage server according to the notification; and a feedback reception module 135 configured to receive download completion information returned by the network storage server.

A reception unit 140 is configured to receive address information of the uploaded downloaded data at the network side fed back by the network storage server 200.

The data stored in the network storage server 200 can be transferred according to the user's needs to a new application environment, for example, a new computer, and thereby it can avoid repeated download and increase the efficiency of obtaining data.

Figure 7A:
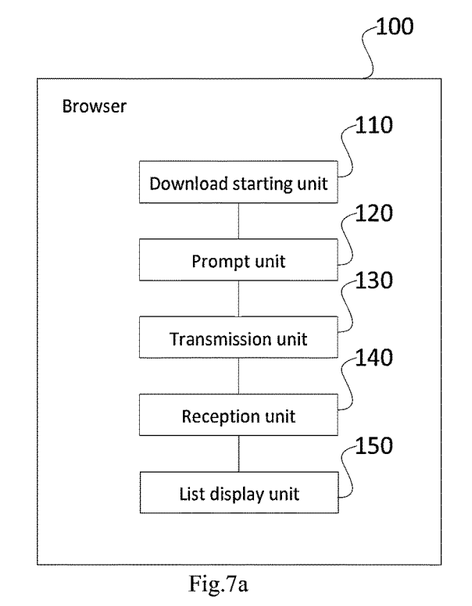
FIG. 7*a* shows a schematic diagram of a modular structure of a browser according to another embodiment of the invention.

FIG. 7*a* shows a schematic diagram of a modular structure of a browser according to another embodiment of the invention. As shown in FIG. 7*a*, the browser as described in this embodiment is substantially the same as the browser described in a previous embodiment, and the difference is that the browser in this embodiment further comprises a list display unit 150.

Figure 7B:
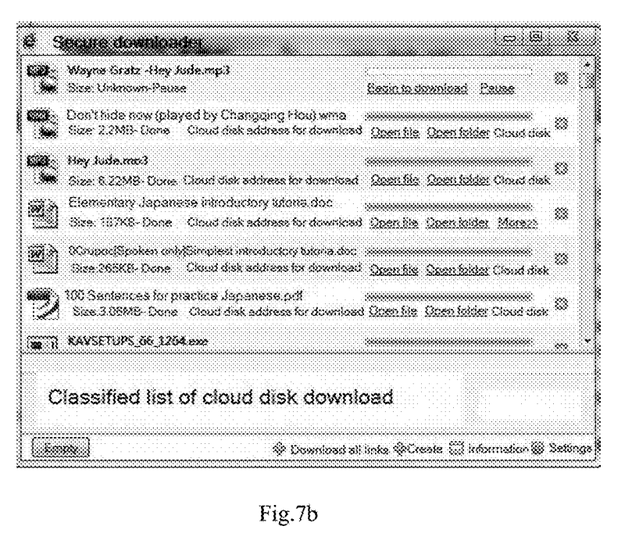
FIG. 7b shows a schematic diagram of a download list according to another embodiment of the invention.

The list display unit 150 is configured to display file information and address information of the downloaded data stored in the network storage server 200 in a download list. Through the download list, the user can more conveniently look up data in the network storage server 200. Referring to FIG. 7*b*, the download list displays file information such as file names, file sizes, etc. of files stored in the network storage server 200, and address information (which is the "cloud disk address for download") stored in the network storage server 200, such that the browser user can perform corresponding re-download and share just by copying the address segment. Further, such entrance links as "open file", "open folder" are prompted to the user, and by clicking a corresponding link, the user can view particular content of a file/folder in the network storage server 200. The downloaded file saved in the network storage server 200 can also be synchronized to the computer side where the browser terminal is located by the network storage server 200. From FIG. 7*b*, it can be seen that the download list of the cloud disk download is mixed with existing general browser download lists, which may also be displayed classified and separated to create a separate "classified list of cloud disk download" (as shown in FIG. 7*b*).

Figure 8:
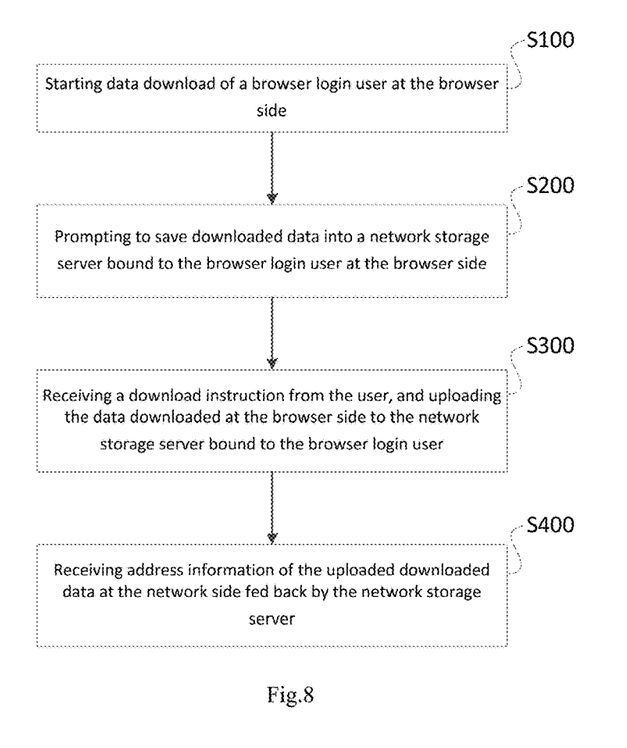
FIG. 8 shows a flow chart of a download method according to an embodiment of the invention.

FIG. 8 shows a flow chart of a download method according to an embodiment of the invention. As shown in FIG. 8, the method implemented by the browser side for download comprises the following steps.

At S100, starting data download of a browser login user at the browser side.

The step S100 comprises:

at S110, performing browser user login at the browser side; and at S120, triggering an establishment of a first download thread when a download link in a browser page is clicked.

The browser login user can be bound to the network storage server, namely, the account and password with which the browser login user logs in the browser are identical to the account and password with which he logs in the network storage server; and after the performing browser user login at the browser side, the method further comprises the step of: establishing a connection between a computer where the browser is located and the network storage server according to the account and password entered when the user has logged in the browser.

At S200, prompting to save downloaded data into a network storage server bound to the browser login user at the browser side.

The step S200 comprises:

at S210, judging whether the browser login user has logged in the network storage server, and if yes, receiving a message sent by the network storage server; or otherwise, prompting the browser login user to log in the network storage server, and after the login is successful, receiving a message sent by the network storage server; and at S220, the first download thread prompting the browser login user in a download interface to save the downloaded data into the network storage server according to the message, and prompting the browser login user to select a corresponding memory address according to a file classification.

There may be multiple network storage servers bound to the browser login user, and the first download thread further prompts the browser login user to select a corresponding network storage server according to the message.

At S300, receiving a download instruction from the user, and uploading the data downloaded at the browser side to the network storage server bound to the browser login user.

The procedure of data transmission at step S300 can be performed according to at least one of the following ways:

1) the first download thread downloads the downloaded data from a resource server to a local computer at the browser side; and an upload thread is started to upload the downloaded data to the network storage server.

2) an upload thread is started in the procedure of the first download thread downloading the downloaded data from a resource server to a local computer at the browser side; and the upload thread simultaneously uploads the downloaded data in the background to the network storage server when the first download thread downloads the downloaded data.

3) the first download thread sends a notification containing information related to the downloaded data to the network storage server;

the network storage server starts a second download thread according to the notification to download the downloaded data to the network storage server; and the network storage server closes the second download thread and returns download completion information to the first download thread.

At S400, receiving address information of the uploaded downloaded data at the network side fed back by the network storage server.

Figure 9:
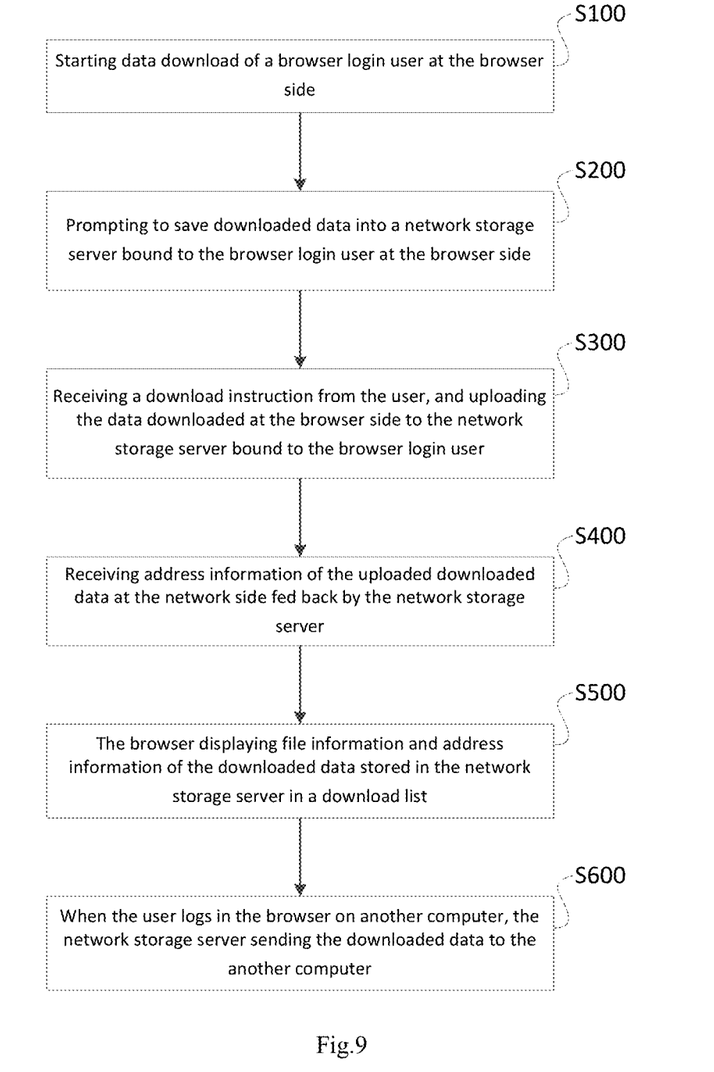
FIG. 9 shows a flow chart of a download method according to another embodiment of the invention.

FIG. 9 shows a flow chart of a download method according to another embodiment of the invention. As shown in FIG. 9, the method as described in this embodiment is substantially the same to the method as described in the previous embodiment, and the difference is that this embodiment further comprises:

at S500, the browser displaying file information and address information of the downloaded data stored in the network storage server in a download list; and at S600, when the user logs in the browser on another computer, the network storage server sending the downloaded data to the another computer.

By uploading data downloaded at a browser side to a network storage server, the browser and system for download and the download method as described in embodiments of the invention can realize storage of downloaded data in the network storage server (also called cloud storage in the field), and when the downloaded data is used again, it can be obtained directly from the network storage server, thereby avoiding the occurrence of a situation of repeated download, and improving the efficiency of a user obtaining and using network data. Meanwhile, when the downloaded data is stored in multiple network storage servers, this may further play the role of data backup and increase the security of data storage.

The algorithms and displays provided here are not inherently related to any specific computer, virtual system or other apparatus. Various general-purpose systems may also be used with the teachings herein. According to the above description, the structure required for constructing such systems is obvious. In addition, the invention is not directed to any specific programming language. It should be understood that the content of the invention described herein may be carried out utilizing various programming languages, and that the above description for a specific language is for the sake of disclosing preferred embodiments of the invention.

For a device embodiment, it is described relatively simply due to its essential similarity to a method embodiment, and as for its relevant parts reference may be made to the description of the parts of the method embodiment.

The individual embodiments in the specification are described using a progressive manner, each embodiment highlights its difference from other embodiments, and identical or similar parts of the individual embodiments may be referred relative to each other.

Embodiments of the individual components of the invention may be implemented in hardware, or in a software module running on one or more processors, or in a combination thereof. It will be appreciated by those skilled in the art that, in practice, some or all of the functions of some or all of the components in a browser client device/download system according to individual embodiments of the invention may be realized using a microprocessor or a digital signal processor (DSP). The invention may also be implemented as an apparatus or device program (e.g., a computer program and a computer program product) for carrying out a part or all of the method as described herein. Such a program implementing the invention may be stored on a computer readable medium, or may be in the form of one or more signals. Such a signal may be obtained by downloading it from an Internet website, or provided on a carrier signal, or provided in any other form.

Figure 10:
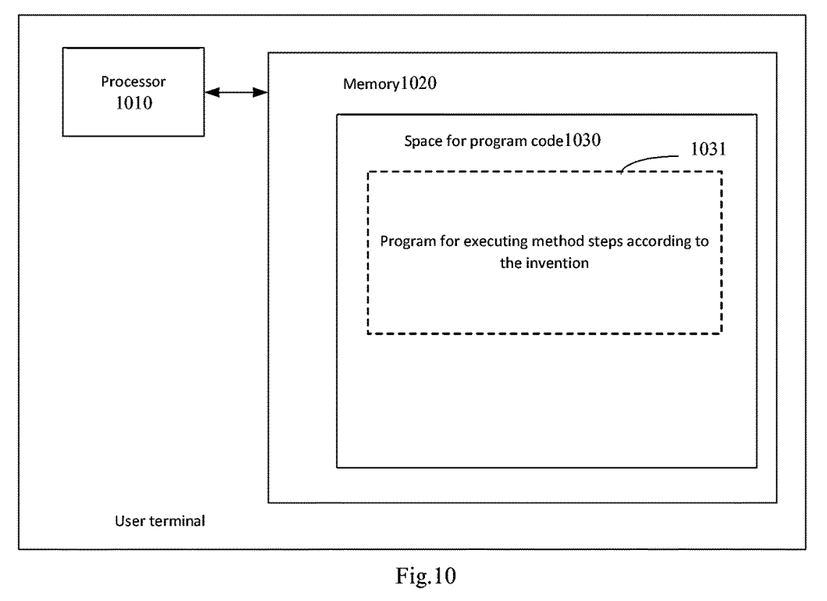
FIG. 10 shows schematically a block diagram of a user terminal for performing a method according to the invention.
Figure 11:
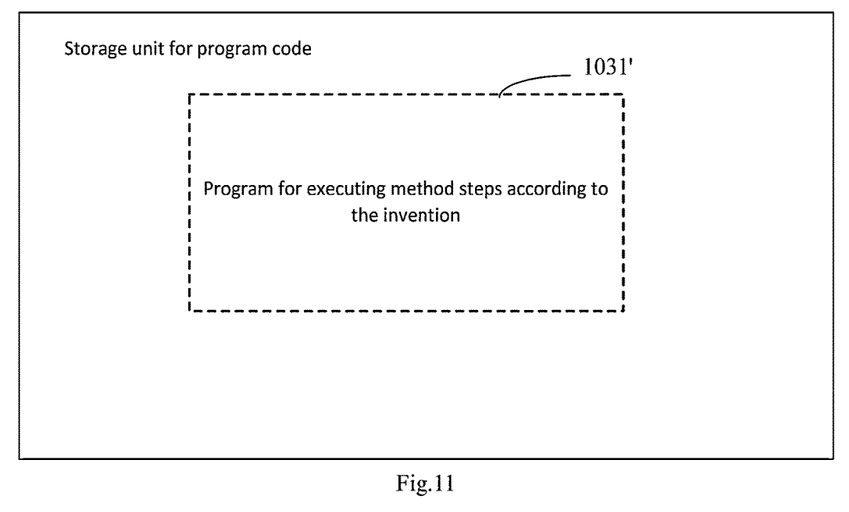
FIG. 11 shows schematically a storage unit for retaining or carrying a program code implementing a method according to the invention.

For example, FIG. 10 schematically shows a user terminal device which may carry out a browser for download according to the invention. The user terminal device traditionally comprises a processor 1010 and a computer program product or a computer readable medium in the form of a memory 1020. The memory 1020 may be an electronic memory such as a flash memory, an EEPROM (electrically erasable programmable read-only memory), an EPROM, a hard disk or a ROM. The memory 1020 has a memory space 1030 for a program code 1031 for carrying out any method steps in the methods as described above. For example, the memory space 1030 for a program code may comprise individual program codes 1031 for carrying out individual steps in the above methods, respectively. The program codes may be read out from or written to one or more computer program products. These computer program products comprise such a program code carrier as a hard disk, a compact disk (CD), a memory card or a floppy disk. Such a computer program product is generally a portable or stationary storage unit as described with reference to FIG. 11. The storage unit may have a memory segment, a memory space, etc. arranged similarly to the memory 1020 in the user terminal of FIG. 10. The program code may for example be compressed in an appropriate form. In general, the storage unit comprises a computer readable code 1031', i.e., a code which may be read by e.g., a processor such as 1010, and when run by a user terminal, the codes cause the user terminal to carry out individual steps in the methods described above.

"An embodiment", "the embodiment" or "one or more embodiments" mentioned herein implies that a particular feature, structure or characteristic described in connection with an embodiment is included in at least one embodiment of the invention. In addition, it is to be noted that, examples of a phrase "in an embodiment" herein do not necessarily all refer to one and the same embodiment.

In the specification provided herein, a plenty of particular details are described. However, it can be appreciated that an embodiment of the invention may be practiced without these particular details. In some embodiments, well known methods, structures and technologies are not illustrated in detail so as not to obscure the understanding of the specification.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several devices, several of the devices may be embodied by one and the same hardware item. Use of the words first, second, and third, etc. does not mean any ordering. Such words may be construed as naming.

Furthermore, it is also to be noted that the language used in the description is selected mainly for the purpose of readability and teaching, but not selected for explaining or defining the subject matter of the invention. Therefore, for those of ordinary skills in the art, many modifications and variations are apparent without departing the scope and spirit of the appended claims. For the scope of the invention, the disclosure of the invention is illustrative, but not limiting, and the scope of the invention is defined by the appended claims.

The invention claimed is:

1. A computing device having a browser for download, the computing device comprising:
   a memory having instructions stored thereon; and
   a processor to execute the instructions to perform operations comprising:
   starting data download of a browser login user from a download data server at the browser;
   prompting to save downloaded data to a network storage server bound to the browser login user at the browser;
   receiving a download instruction from the browser login user, and uploading the data downloaded at the browser to the network storage server bound to the browser login user; and
   receiving address information of the uploaded downloaded data fed back by the network storage server.

2. The computing device as claimed in claim 1, wherein the starting data download of a browser login user from a download data server at the browser comprises:
   performing browser user login at the browser side; and
   triggering an establishment of a first download thread when a download link is selected in a browser page.

3. The computing device as claimed in claim 2, wherein the prompting to save the downloaded data to the network storage server bound to the browser login user at the browser comprises:
   determining whether the browser login user has logged in the network storage server, and when the browser login user has logged in the network storage server, receiving a message sent by the network storage server, or when the browser login user has not logged in the network storage server, prompting the browser login user to log in the network storage server, and after the login is successful, receiving a message sent by the network storage server; and
   the first download thread prompting the browser login user in a download interface to save the downloaded data into the network storage server according to the message, and prompting the browser login user to select a corresponding memory address according to a file classification.

4. The computing device as claimed in claim 3, wherein the uploading the data downloaded at the browser to the network storage server bound to the browser login user comprises:
   the first download thread downloading the data from a resource server to the computing device; and
   starting an upload thread to upload the downloaded data to the network storage server.

5. The computing device as claimed in claim 4, wherein the uploading the data downloaded at the browser to the network storage server bound to the browser login user comprises:
   starting an upload thread by the first download thread downloading the data from a resource server to the computing device; and
   the upload thread simultaneously uploading the downloaded data in the background to the network storage server when the first download thread downloads the downloaded data.

6. The computing device as claimed in claim 4, wherein the uploading the data downloaded at the browser to the network storage server bound to the browser login user comprises:
   the first download thread sending a notification containing information related to the downloaded data to the network storage server;
   the network storage server starting a second download thread according to the notification to download the downloaded data to the network storage server; and
   the network storage server closing the second download thread and returning download completion information to the first download thread.

7. The computing device as claimed in claim 2, wherein an account and a password that the browser login user uses to log in the browser are identical to the account and the password that the browser login user uses to log in the network storage server; and
   after the performing browser user login at the browser, the operations further comprise:
   establishing a connection between the computing device and the network storage server according to the account and the password entered when the user logs in the browser.

8. A download system comprising a computing device having a browser and a network storage server;
   the computing device comprising:
   a memory having instructions stored thereon; and
   a processor to execute the instructions to perform operations comprising:
   starting data download of a browser login user from a download data server at the browser;
   prompting to save downloaded data to a network storage server bound to the browser login user at the browser;
   receiving a download instruction from the browser login user, and uploading the data downloaded at the browser to the network storage server bound to the browser login user; and
   receiving address information of uploaded downloaded data fed back by the network storage server; and
   the network storage server comprising:
   a memory having instructions stored thereon; and
   a processor to execute the instructions to perform operations comprising:
   storing the uploaded downloaded data; and
   feeding address information of the uploaded downloaded data back to the browser.

9. The system as claimed in claim 8, wherein the operations further comprise:
sending a message to the browser that has logged in the network storage server.

10. The system as claimed in claim 9, wherein the prompting to save the downloaded data to the network storage server bound to the browser login user at the browser comprises:
determining whether the browser login user has logged in the network storage server, and when the browser login user has logged in the network storage server, receiving a message sent by the network storage server, or when the browser login user has not logged in the network storage server, prompting the browser login user to log in the network storage server, and after the login is successful, receiving a message sent by the network storage server; and
a first download thread prompting the browser login user in a download interface to save the downloaded data in the network storage server according to the message, and prompting the browser login user to select a corresponding memory address according to a file classification.

11. A method for downloading data at a computing device having a browser, the method comprising:
starting, by a processor, data download of a browser login user from a download data server at the browser;
prompting, by the processor, to save downloaded data to a network storage server bound to the browser login user at the browser;
receiving, by the processor, a download instruction from the browser login user, and uploading the data downloaded at the browser to the network storage server bound to the browser login user; and
receiving, by the processor, address information of the uploaded downloaded data fed back by the network storage server.

12. The method as claimed in claim 11, wherein the starting data download of the browser login user from the download data server at the browser comprises:
performing browser user login at the browser; and
triggering an establishment of a first download thread when a download link in a browser page is selected.

13. The method as claimed in claim 12, wherein an account and a password that the browser login user uses to log in the browser are identical to the account and the password that the browser login user uses to log in the network storage server; and
after the performing browser user login at the browser, the method further comprises:
establishing a connection between the computing device having the browser and the network storage server according to the account and the password entered when the browser login user logs in the browser.

14. The method as claimed in claim 12, wherein the prompting to save the downloaded data to the network storage server bound to the browser login user at the browser comprises:
determining whether the browser login user has logged in the network storage server, and when the browser login user has logged in the network storage server, receiving a message sent by the network storage server, or when the browser login user has not logged in the network storage server, prompting the browser login user to log in the network storage server, and after the login is successful, receiving a message sent by the network storage server; and
the first download thread prompting the browser login user in a download interface to save the downloaded data to the network storage server according to the message, and prompting the browser login user to select a corresponding memory address according to a file classification.

15. The method as claimed in claim 14, wherein multiple network storage servers are bound to the browser login user, and the first download thread further prompts the browser login user to select a corresponding network storage server according to the message.

16. The method as claimed in claim 14, wherein the uploading the data downloaded at the browser to the network storage server bound to the browser login user comprises:
the first download thread downloading the data from a resource server to the computing device having the browser; and
starting an upload thread to upload the downloaded data to the network storage server.

17. The method as claimed in claim 14, wherein the uploading the data downloaded at the browser to the network storage server bound to the browser login user comprises:
starting an upload thread by the first download thread downloading the data from a resource server to the computing device at the browser; and
the upload thread simultaneously uploading the downloaded data in the background to the network storage server when the first download thread downloads the downloaded data.

18. The method as claimed in claim 14, wherein the uploading the data downloaded at the browser to the network storage server bound to the browser login user comprises:
the first download thread sending a notification containing information related to the downloaded data to the network storage server;
the network storage server starting a second download thread according to the notification to download the downloaded data to the network storage server; and
the network storage server closing the second download thread and returning download completion information to the first download thread.

19. The method as claimed in claim 11, wherein after the receiving address information of the uploaded downloaded data at the network side fed back by the network storage server, the method further comprises:
when the user logs in the browser on another computer, the network storage server sending the downloaded data to the another computer.

20. The method as claimed in claim 11, wherein after the network storage server feeds address information storing the data back to the browser, the method further comprises:
the browser displaying file information and address information of the downloaded data stored in the network storage server in a download list.

* * * * *